United States Patent
Surkatty et al.

(10) Patent No.: US 11,470,048 B1
(45) Date of Patent: Oct. 11, 2022

(54) VIRTUAL PRIVATE NETWORK ENVIRONMENTS FOR SERVERLESS CODE EXECUTIONS

(71) Applicant: Amazon Technologies, Inc., Seattle, WA (US)

(72) Inventors: Osman Surkatty, Seattle, WA (US); David Yanacek, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 16/912,485

(22) Filed: Jun. 25, 2020

(51) Int. Cl.
*H04L 9/40* (2022.01)
*G06F 9/455* (2018.01)
*G06F 9/48* (2006.01)
*H04L 12/66* (2006.01)

(52) U.S. Cl.
CPC ...... *H04L 63/0272* (2013.01); *G06F 9/45558* (2013.01); *G06F 9/4881* (2013.01); *H04L 12/66* (2013.01); *H04L 63/0263* (2013.01); *H04L 63/10* (2013.01); *G06F 2009/45595* (2013.01)

(58) Field of Classification Search
CPC . H04L 63/0272; H04L 63/0263; H04L 63/10; H04L 12/66; G06F 9/45558; G06F 9/4881; G06F 2009/45595
See application file for complete search history.

(56) References Cited

U.S. PATENT DOCUMENTS

| | | | | |
|---|---|---|---|---|
| 9,811,363 B1 * | 11/2017 | Wagner | .................. | G06F 9/5033 |
| 9,811,434 B1 * | 11/2017 | Wagner | .................. | G06F 11/30 |
| 9,830,175 B1 * | 11/2017 | Wagner | ............... | G06F 9/45558 |
| 9,830,449 B1 * | 11/2017 | Wagner | ............... | G06F 9/45508 |
| 10,621,001 B1 * | 4/2020 | Braverman | ........... | G06F 9/4881 |
| 10,725,752 B1 * | 7/2020 | Wagner | ................. | G06F 16/183 |
| 10,776,091 B1 * | 9/2020 | Wagner | ............... | G06F 9/45558 |
| 10,785,056 B1 * | 9/2020 | Mathur | ............... | G06F 9/45558 |
| 11,099,870 B1 * | 8/2021 | Brooker | .............. | G06F 11/1446 |
| 11,231,955 B1 * | 1/2022 | Shahane | ............... | G06F 9/5022 |
| 11,250,007 B1 * | 2/2022 | Harris | .................. | G06F 16/148 |

(Continued)

OTHER PUBLICATIONS

Ben Eichorst and Veronika Megler, "How to Provision Complex, On-Demand Infrastructures by Using Amazon API Gateway and AWS Lambda," AWS Compute Blog, Sep. 12, 2017. (Year: 2017).*

(Continued)

*Primary Examiner* — Alina A Boutah

(74) *Attorney, Agent, or Firm* — Knobbe, Martens, Olson & Bear, LLP

(57) ABSTRACT

Systems and methods are described for providing on-demand virtual private environments (VPEs) to serverless code executions. Each VPE can represent a logical isolated network environment. On receiving a request to execute code, an on-demand code execution system can generate a VPE for the code and provision the VPE with network endpoints and gateways that provide access to network services and locations that the code is permitted to access, which services and locations can be identified based on permissions for the code. The on-demand code execution system can then execute the code within an execution environment attached to the VPE, such that network transmissions caused by the code are subject to network-level enforcement of the permissions for the code.

20 Claims, 6 Drawing Sheets

(56) References Cited

U.S. PATENT DOCUMENTS

| | | | | |
|---|---|---|---|---|
| 2014/0237585 A1* | 8/2014 | Khan | ................. | H04L 63/0272 |
| | | | | 726/15 |
| 2019/0260754 A1* | 8/2019 | Hecht | ................... | H04L 63/102 |
| 2019/0391834 A1* | 12/2019 | Mullen | ................ | G06F 9/5005 |
| 2020/0366716 A1* | 11/2020 | Singh | ..................... | G06N 3/088 |
| 2020/0412707 A1* | 12/2020 | Siefker | ................ | H04L 63/101 |
| 2020/0412720 A1* | 12/2020 | Siefker | .............. | H04L 41/0895 |
| 2021/0243183 A1* | 8/2021 | Clark | ................... | H04W 84/18 |

OTHER PUBLICATIONS

"Serverless on AWS Build and run applications without thinking about servers," Amazon Web Services, Inc. (Year: 2022).*

* cited by examiner

VIRTUAL PRIVATE NETWORK ENVIRONMENTS FOR SERVERLESS CODE EXECUTIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Somewhat similar, network virtualization technologies exist that allow for creation of virtualized network environments at a host computing device, or on multiple host computing devices connected via a physical substrate network. Virtualized network environments can operate in a manner logical similar or equivalent to a corresponding physical network, but may be created, maintained, deleted, or otherwise managed via software. Moreover, a single host device or physical substrate network can host multiple virtualized network environments.

While virtualization of computing and network resources can provide many benefits and in particular can remove a need to physically configure hardware, creation of virtual machines and/or virtual networks often requires significant expertise and configuration, limiting adoption of these technologies in some circumstances. Moreover, incorrect configuration can in many instances create security vulnerabilities, leaving data or resources vulnerable to attack.

DETAILED DESCRIPTION

Figure 1:
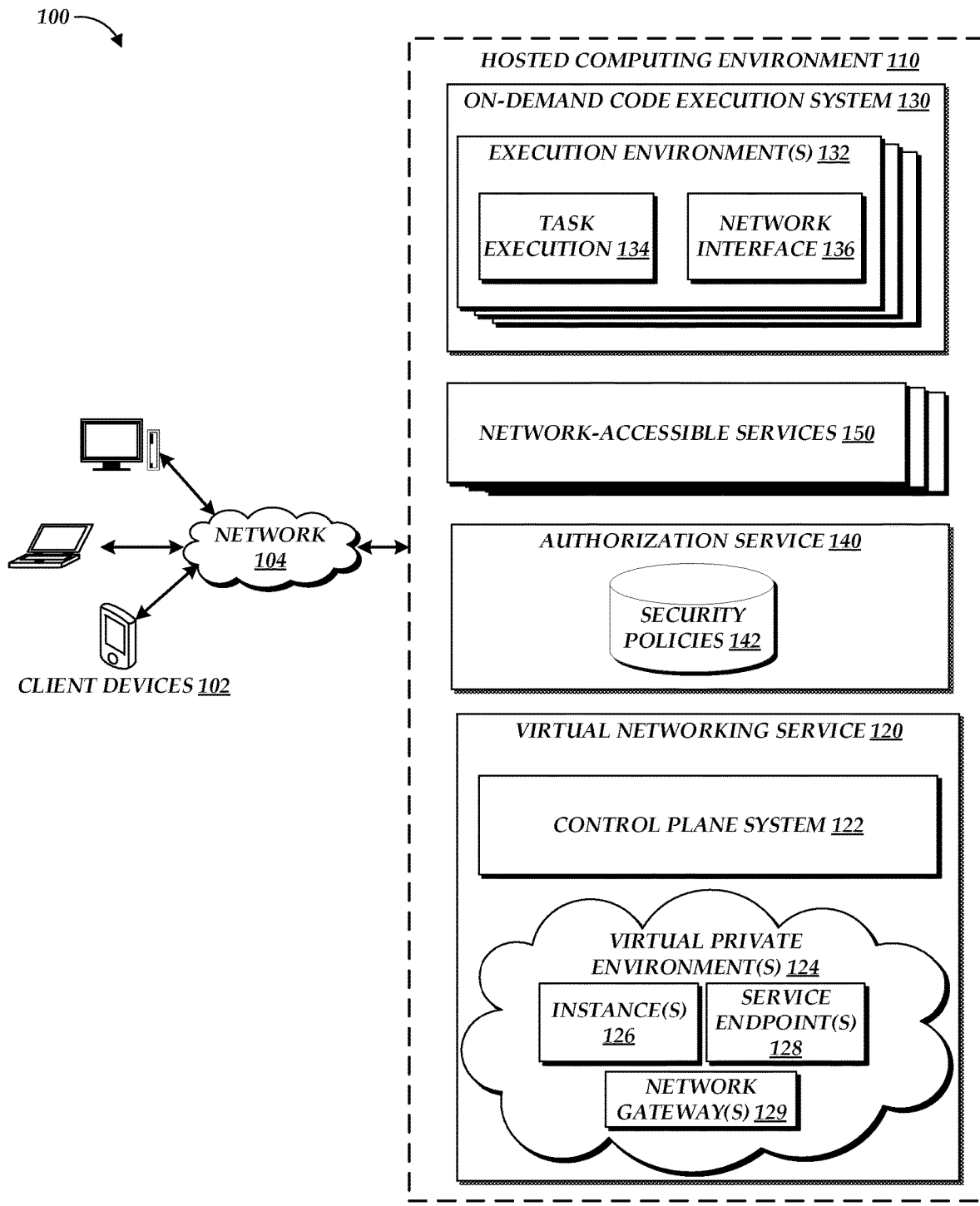
FIG. 1 is a block diagram depicting an illustrative environment in which a hosted computing environment can provide on-demand virtual private network environments for code executions on an on-demand code execution system.

Generally described, aspects of the present disclosure relate to facilitating secure execution of on-demand code executions by providing programmatically configured virtual private network environments in which such executions occur. More specifically, a user may establish a "task" on an on-demand code execution system, which task is represented by a set of user-defined code. The on-demand code execution system (which in some cases may also be referred to as a "serverless" system) can enable the user to request execution of the task and, in response, execute the code thus implementing desired functionality of the user. The user may further specify permissions for the task, designating for example network-accessible services that executions of the task should have access to (or constraints on such access). To provide additional security to the task execution, the on-demand code execution system can further enable a user to request that executions of the task occur within a virtual private network environment, which represents a network environment that, by default, is logically isolated from other networks. In accordance with embodiments of the present disclosure, the virtual private network environment can be configured to enable access to only to network destinations selected based on the permissions for the tasks and, in some instances, to validate that network requests to access network-accessible services comply with those permissions. Thus, in addition to potentially being subject to service-level permissions validation, executions of the task can be subject to network restrictions that reduce likelihood of security breaches when executing the task.

As described herein, an on-demand code execution system enables rapid execution of source code, which may be supplied by users of the on-demand code execution system. For example, a user may submit a script in a specific programming language (e.g., the PYTHON™ language) that, when executed, implements network-based processing for a user-facing application (e.g., a mobile device "app"). The on-demand code execution system can then enable the user to submit "calls" to execute that script, at which point the system will securely execute the script to provide the desired functionality.

Embodiments for providing an on-demand code execution system are provided, for example, in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. In brief, an on-demand code execution system can enable client devices to submit executable code (e.g., source code) implementing desired functionality, which functionality is generally referred to herein as a "task." The system can further enable a client device to define one or more triggers that result in execution of the code on the system. For example, a client device 102 may request that each time a specific application programming interface (API) call is made, the code should be executed on the system 130. When a trigger occurs, the system can configure an execution environment for the code, which may correspond to a virtual machine instance, a software container, or other logically isolated environment in which code can execute. The system can then execute the code within the environment, resulting in a task execution. When the task execution completes, the system can remove the environment, thus freeing computing resources for other task executions.

Unlike some other network-based services, an on-demand code execution system can remove the need for a user to maintain or configure a computing device, either virtual or physical, to support code execution. Due to this lack of need for a user to maintain a device, on-demand code execution systems are sometimes referred to as "serverless" systems (though of course the on-demand code execution system itself, as opposed to individual users, may maintain servers to support code execution).

The execution environment for a task on an on-demand code execution system may be provided with varying levels of network access. Illustratively, the execution environment may by default be provided with general access to a default network, such as the Internet. As such, a task execution within the environment may be relatively unrestricted in the type of transmissions made over the network (though a provider of the default network may implement various security measures that provide some level of restriction, such as detection of "spam" or malicious transmissions). As another option, where a provider of the on-demand code execution system also provides a service enabling virtual private network environments (or "VPEs"), an environment of a task execution may be placed "inside" such an environment. Generally described, a VPE can represent a virtualized computing network (hosted by a host device or multiple host devices on a physical network) that enables devices connected (or "inside") the VPE to communicate as if they were connected to one another via a physical local area network (LAN). VPEs may in some instances be referred to as "virtual private clouds" ("VPCs"). Where a provider of the on-demand code execution system also provides for creation of VPEs, the on-demand code execution system may enable execution of a task within the VPE. For example, the on-demand code execution system may create or select an execution environment that is "inside" the VPE (e.g., has direct network access to the VPE as a member of that network), and execute the task within that environment. The VPE may be configured to enforce various network restrictions or with various network configurations that limit ingress and egress of data in or out of the VPE, and by executing the task within an environment that is a member of the VPE, the task execution can thus be made subject to the network restrictions of the VPE. This may be desirable, for example, to limit the possibility that a task execution can occur maliciously (e.g., due to a malformed execution request, fraudulent access to an account authorized to execute a task, etc.).

While execution of a task within a VPE may be desirable for security purposes, a requirement to utilize a pre-existing VPE for such execution may pose various barriers and incur various drawbacks. For example, creation of a VPE may be non-trivial, requiring significant expertise on the part of a creating user. Misconfiguration of a VPE may, for example, expose resources within that VPE in a manner that is not intended, potentially exposing sensitive or confidential information in an insecure manner. Moreover, the continued implementation of a VPE may require non-trivial amounts of computing resources on the part of a VPE provider. When an end user to does require continuous use of a VPE, the continued implementation of the VPE therefore represents an inefficient use of computing resources.

The present disclosure addresses these problems by providing for programmatic creation and configuration of a VPE in which a task on an on-demand code execution system can be executed. In accordance with embodiments of the present disclosure, the system can further configure the VPE with permissions appropriate for the task, which can be derived from existing permissions of the task. Illustratively, an owner of a task (e.g., a user that created the task on the on-demand code execution system) may specify permissions of the task designating, for example, network addresses or network-accessible services to which the task should have access. The system can therefore configure the VPE to enforce such permissions, thereby adding a layer of security at the network-level for the task execution without requiring a user to manually specify such network-level permissions. Thus, by programmatically deriving network-level permissions from existing task permissions, configuration of a VPE can be greatly simplified. Accordingly, much like how the on-demand code execution system removes a need for a user to configure and maintain an execution environment (e.g., a virtual machine) for task executions, use of on-demand VPEs can remove the need for users to configure and maintain VPEs. Moreover, in some embodiments the system may facilitate creation of a VPE in response to a call to execute a task being obtained at the on-demand code execution system. The system can maintain the VPE during times when a task execution is occurring and for a period thereafter (e.g., 5 minutes, 10 minutes, 1 hour, 2 hours, etc.). In the instance that no task execution occurs for that period, the system can "tear down" the VPE, thus making resources used to create the VPE available for other purposes. In this manner, a VPE can be provided "on-demand," in a similar way to how an execution environment is provided on-demand during execution of a task.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with a hosted computing environment 110 via a network 104. By way of illustration, various example client devices 102 are shown in communication with the hosted computing environment 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The hosted computing environment 110 may provide the client devices 102 with one or more user interfaces, command-line interfaces (CLIs), application programing interfaces (APIs), and/or other programmatic interfaces for utilizing services provided by the hosted computing environment 110, including a virtual networking service 120, an on-demand code execution system 130, an authorization service 140, and other network-accessible services 150. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the hosted computing environment 110.

The client devices 102 and hosted computing environment 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 2:
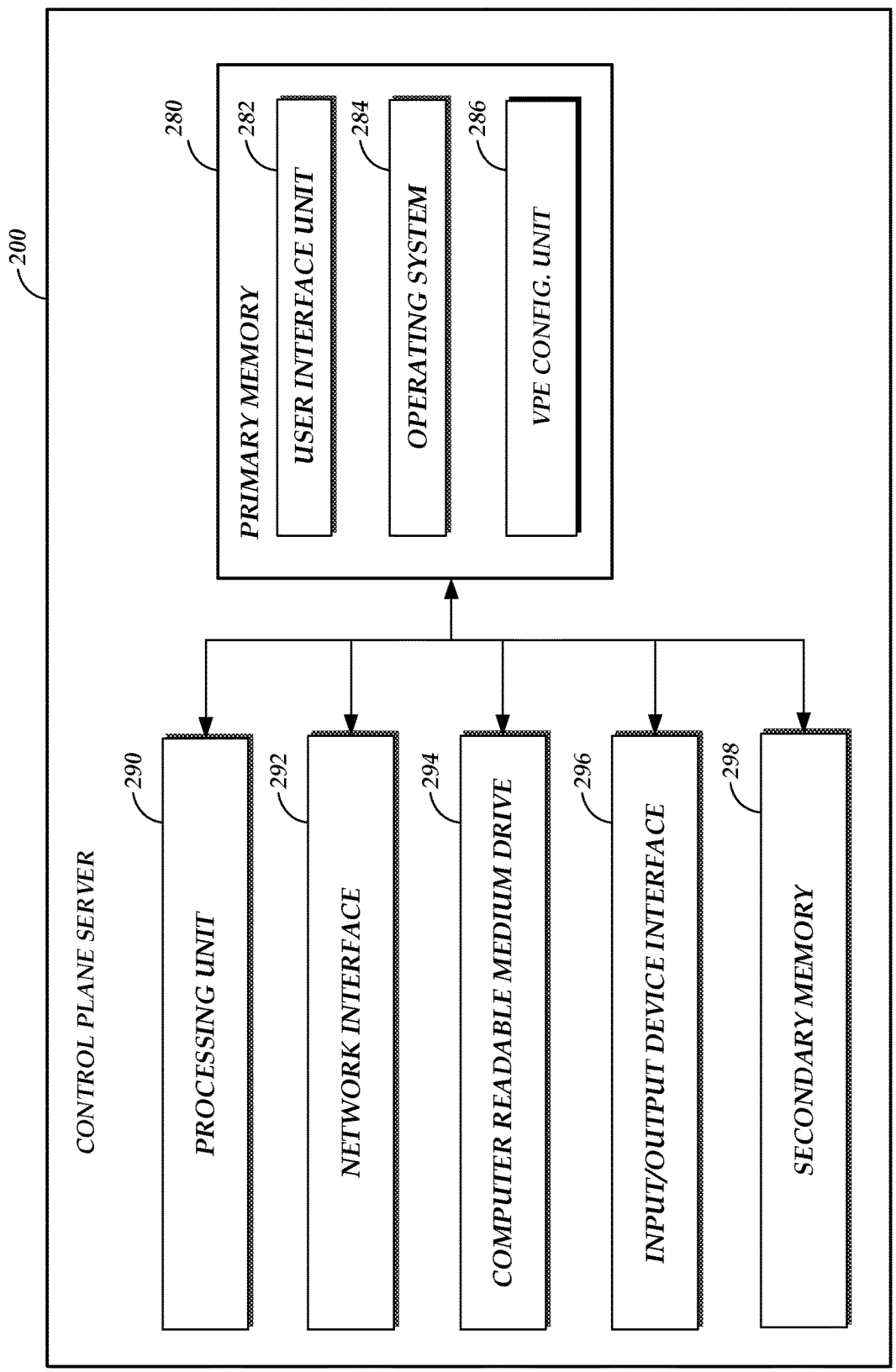
FIG. 2 depicts a general architecture of a computing device providing the control plane system of FIG. 1.

The hosted computing environment 110 is depicted in FIG. 2 as operating in a distributed computing environment including several computer systems that are interconnected using one or more computer networks (not shown in FIG. 2), which systems operate to provide the virtual networking service 120, on-demand code execution system 130, authorization service 140, and other network-accessible services 150. Illustratively, the environment 110 includes a number of rapidly provisioned and released computing resources configured to provide the virtual networking service 120, on-demand code execution system 130, authorization service 140, and other network-accessible services 150. The hosted computing environment 110 may also be referred to as a "cloud computing environment." Each of the virtual networking service 120, on-demand code execution system 130, authorization service 140, and other network-accessible services 150 could also operate within a computing environment having a fewer or greater number of devices than are illustrated in FIG. 1. Thus, the depiction of the virtual networking service 120, on-demand code execution system 130, authorization service 140, and other network-accessible services 150 in FIG. 1 should be taken as illustrative and not limiting to the present disclosure. For example, the elements of the environment 110 or various constituents thereof could implement various Web services components and/or peer to peer network configurations to implement at least a portion of the processes described herein. In some instances, two or more of the virtual networking service 120, on-demand code execution system 130, authorization service 140, and other network-accessible services 150 may be combined into a single service. Each of the virtual networking service 120, on-demand code execution system 130, authorization service 140, and other network-accessible services 150 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

The virtual networking service 120 can provide, for the benefit of client devices 102, virtual network environments 124. Within the hosted computing environment 100, each virtual private environment 124 represents a virtual networking environment that is logically isolated from other environments 124, as well as from other networks. Each environment 124 may include one or more virtual computing devices (e.g., virtual machines or VMs) provided by the environment 110 and configured to operate on behalf of a user, such as to provide a service. These virtual computing devices are shown in FIG. 1 as instances 126. For example, a user may provision an environment 124 with a database instance, a general purpose virtual machine (e.g., running a general purpose operating system), an instance providing network-accessible storage, or the like. While instances 126 are shown as "inside" the VPEs 124 of FIG. 1, instances 126 may in fact be provided by other network-accessible services 150 of the environment 110. For example, one network-accessible service 150 may be a virtual compute service that enables users to request and configure virtual machines (hosted on underlying host devices of the virtual compute service) as instances 126. The user may then interact with the virtual networking service 120 to logically place the instance 126 into a VPE 124. In one embodiment, the virtual networking service 120 and/or the virtual compute service may provide for creation of logical network adapters that can be "attached" to an instance 126 in a similar manner that a physical network interface controller (NIC) can be physically installed into a non-virtualized computer. Such a logical network device may be logically linked to a VPE, such that by attaching the device to an instance 126, the instance joins the VPE as a member of that network.

The hosted computing environment 110 is illustratively configured to enable devices within each virtual private environment 124 to interact with one another as if they were connected via a physical LAN. For example, where each device within an environment 124 is a virtual computing device hosted by a physical computing device, the hosted computing environment 110 may use virtual networking techniques to encapsulate traffic from the virtual computing devices, and pass that traffic over a substrate physical network connecting the physical computing devices. On receiving traffic from a first virtual device in an environment 124 over the substrate physical network, a physical device may decapsulate the traffic (e.g., strip away encapsulating headers to return the packet to its original state prior to encapsulation) and pass the traffic to another virtual device in the environment 124. Thus, devices in an environment 124 may communicate as if they connected within a physical LAN, even when geographically distant. A variety of techniques for implementing virtual networks between computing devices are known in the art and thus will not be described in detail herein.

As noted above, each VPE 124 may be logically isolated from other VPEs 124 and other networks. To enable instances 126 within the VPE to communicate with other networks or network-accessible services, a VPE 124 can be further provisioned with one or more service endpoints 128 and/or network gateways 129. Each service endpoint 128 can represent a logical network destination to which requests for a network-accessible service (including the services 150, the on-demand code execution system 130, the authorization service 140, etc.) can be transmitted. Thus, requests transmitted to the endpoint 128 within the VPE 124 are routed to the corresponding service for processing. In some instances, endpoints 128 can be associated with permissions specifying criteria for handling requests transmitted to the endpoint 128. For example, an endpoint 128 can be configured to forward to a corresponding service only requests coming from specific instances 126, including various service-specific parameters, transmitted during specific times, etc. Thus, endpoints 128 can allow for service-specific traffic to exit the VPE 124, subject to potential restrictions associated with such endpoints 128.

In addition to endpoints 128, a VPE 124 can in some cases include one or more gateways 129. Each gateway 129 may function as a logical network gateway, and provide access to another network in accordance with standard routing protocols. For example, if a VPE 124 is to be connected to the network 104, a gateway 129 can be added to the VPE 124 and configured to forward traffic between the network 104 and the VPE 124. Similarly to service endpoints 128, a gateway 129 can be configured with security policies that specify criteria for handling traffic at the gateway 129. For example, the gateway 129 can be configured with "whitelists" or "blacklists" that allow or deny traffic meeting specific criteria, respectively. The criteria may be based on various attributes of the traffic, such as source address, destination address, packet length, packet content, etc. Thus, by use of endpoints 128 and gateways 129, a user can gain a high level of control over the data that enters or exists a VPE 124.

To facilitate creation and management of VPEs 124, the virtual networking service 120 includes a control plane system 122, which can provide interfaces to create, manage, or destroy VPEs 124. For example, the system 122 can enable a client device 102 to create a VPE 124, attach instances 126 to the VPE 124, or include service endpoints 128 and/or gateways 129 in the VPE 124.

In addition to the virtual networking service 120, the hosted computing environment 110 includes a number of additional services generally accessible by users. For example, the environment 110 includes an on-demand code execution system 130 enabling on-demand execution of user-defined code. The on-demand code execution system 130 may also be referred to as a serverless computing system. Embodiments for providing an on-demand code execution system 130 are provided, for example, in the '556 Patent, incorporated by reference above. As noted above, the on-demand code execution system 130 can enable client devices 102 to submit executable code (e.g., source code) implementing desired functionality, which functionality is generally referred to herein as a "task," and to define one or more triggers that result in execution of the code on the system 130. When a trigger occurs, the system 130 can configure an execution environment 132 for the code, which may correspond to a virtual machine instance, a software container, or other logically isolated environment in which code can execute. The system 130 can then execute the code within the environment 132, resulting in a task execution 134. When the task execution 134 completes, the system 130 can remove the environment 132 (e.g., after a threshold period of time passes), thus freeing computing resources for other task executions. The system 130 can thus enable a client device 102 to execute user-defined code on the system 130, without requiring the user to handle aspects of execution such as acquiring a computing device, provisioning the device with the code, etc.

The on-demand code execution system 130 can provide varying levels of network access to the execution environments 132 by provisioning the environments 132 with logical network interfaces 136. For example, the system 130 may provide some environments 132 with access to the network 104, such as by attaching a logical network interface 136 to the environment 132 that is logically coupled to the network 104. Additionally or alternatively, the system 130 may provide access to a VPE by provisioning an environment 132 with an interface 136 that is logically coupled to the VPE 124. Thus, network access of a task execution 134 can be controlled in a manner desired by an owner of the task.

In addition to the on-demand code execution system 130 and virtual networking service 120, the environment 110 can include a variety of additional services 150. Any number of network-accessible services 150 are known in the art and may be implemented as a service 150. For example, the services 150 may include a virtual compute service by which a user may configure and gain access to a virtual machine, a virtual block storage service by which a user may configure and gain access to a virtual block storage device (e.g., a virtual hard disk drive, which may illustratively provide disk storage for a virtual machine), an object storage service by which a user may store and retrieve arbitrary data objects, a database service by which a user may create, configure, and access a database, etc. Thus, a user may obtain a variety of services on the environment 110. These services may interact in various manners to provide desired functionality of a user. For example, a user may obtain virtual computing resources from a virtual compute service, attach to such compute resources block storage, backup data of block storage to an object storage system, access a database on a data service from the virtual compute resources, etc.

To facilitate secure access to the variety of services provided, the environment 110 further includes an authorization service 140, which may store security policies 142 designating criteria for access to the services (e.g., the on-demand code execution system 130, services 150, virtual networking service 120, etc.). The specific criteria may vary according to the service. For example, an object storage service may store data objects according to a specific storage arrangement, such as "buckets" of data. Security policies 142 may therefore designate what users have access to each "bucket." Similarly, a policy for an environment 124 may specify who has access to add instances to the environment 124, who has access to add endpoints or gateways to the environment 124, etc. In some instances, policies may relate to a combination of services provided by the environment 110. For example, the authorization service 140 may store policies for a particular task on the system 130 that designates what services should be accessible to the task and under what conditions. When a request is obtained at a service, the service may pass information regarding the request to the authorization service 140, which may evaluate the request according to the policies 142 and return an authorization decision (e.g., "allow" or "deny"). The service that fielded the request may then process the request according to the decision. Thus, security can be maintained at the environment 110.

In accordance with embodiments of the present disclosure, additional security can be provided for task executions 134 on the on-demand code execution system 130 by utilizing PEs 124 configured to enforce a security policy 142 for the task at the network level, with network-level policies derived from that existing security policy 142 (which may not, for example, contain network-level policies). Specifically, in accordance with some embodiments of the present disclosure, an owner of a task may request that the task execute in a task-specific VPE 124, which VPE 124 is created on-demand by the system 130 and thus need not exist prior to a call to execute the task. Accordingly, when a request to execute a task is obtained at the system 130, the system 130 can create a VPE 124 for the task, and place execute the task within an environment 132 attached to the VPE 124. The system 130 can further configure the VPE 124 with a set of service endpoints 128 and network gateways 129 configured to enforce permissions determined based on the security policy 142 for the task. Thus, in addition to task-level permissions (e.g., permissions enforced at the environment) and service-level permissions (e.g., permissions enforced at the individual services), the task execution 134 can be made subject to network-level permissions derived from task-level and service-level permissions. Use of such network-level permissions can increase security relative to non-use of network-level permissions, as vulnerabilities may exist at the task or service level that do not exist at the network level. This may be particularly true at the task-level, since the user-defined code of the task may have high levels of access to the execution environment 132.

FIG. 2 depicts a general architecture of a computing system (a control plane server 200) implementing the control plane system 122 of FIG. 1. The general architecture of the server 200 depicted in FIG. 2 includes an arrangement of computer hardware and software that may be used to implement aspects of the present disclosure. The hardware may be implemented on physical electronic devices, as discussed in greater detail below. The server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the server 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the server 200, with a higher speed but lower total capacity than secondary memory 298.

The primary memory 280 may store an operating system 284 that provides computer program instructions for use by the processing unit 290 in the general administration and operation of the server 200. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device.

In addition to and/or in combination with the user interface unit 282, the memory 280 may include a VPE configuration unit 286 that facilitates creation and management of VPEs 124. Illustratively, the VPE configuration unit 286 may configure the server 200 to accept requests to create or modify a VPE 124, and may implement those requests (e.g., by instructing physical host devices implementing the service 120 to route network traffic in a manner corresponding to a configuration of a VPE 124).

The server 200 of FIG. 32 is one illustrative configuration of such a device, of which others are possible. For example, while shown as a single device, a server 200 may in some embodiments be implemented as multiple physical host devices. In other embodiments, the server 200 may be implemented as one or more virtual devices executing on a physical computing device. While described in FIG. 2 as a server 200, similar components may be utilized in some embodiments to implement other devices shown in the environment 100 of FIG. 3.

With reference to FIG. 3, illustrative interactions will be described for providing an on-demand VPE in which to execute a task on the on-demand code execution system 130, in response to a call to execute the task. For purposes of FIG. 3, it is assumed that a user has previously established a task on the system 130, such as by providing to the system 130 code of the task and a configuration for the task. It is further assumed that the task is associated (e.g., at the authorization service 140) with a set of permissions designating services and/or network locations that the task is permitted to access, potentially with criteria for such access. Illustratively, prior to the interactions of FIG. 3, an owner of the task (e.g., using a client device 102) may interact with the environment 110 to designate such permissions. Illustratively, each permission within the set of permissions may designate a desired result (e.g., permit or deny) and criteria to which that result applies. The criteria can include, for example, a target of a network transmission (e.g., an identifier of a service, a network location in the form of internet protocol (IP) address or uniform resource identifier (URI)), and attributes of that transmission (e.g., timing, size, contents, etc.). The permissions may illustratively be ranked such that a first permission matching a transmission is applied to the transmission. In some instances, multiple distinct permissions may exist that are combined to form the set of permissions. For example, the authorization service 140 may hold security policies 142 for each of a number of services 150, and each such service 150 may be associated with a policy 142 that permits or denies the task access to the service 150 (e.g., as a service-level permission). Thus, the set of permissions may aggregate all such service-level permissions. Additionally or alternatively to manual setting of permissions by an owner of a task, in some embodiments permissions of a task may be programmatically determined by the on-demand code execution system 130. For example, the on-demand code execution system may evaluate code of the task to identify network transmissions expected to be caused during execution of the task (e.g., based on identification of a "request" function within the code that includes an IP address or URI), and may set permissions such that identified network transmission are permitted. As discussed below, such permissions can be used to generate a VPE including endpoints and/or gateways that enforce the permissions at a network-level.

With reference to FIG. 3, at (1), the on-demand code execution system 130 obtains a call to execute a task. The call may originate, for example, from a client device 102 or other network device.

At (2), the on-demand code execution system 130 transmits to the virtual networking service 120 a request to create a task-specific VPE with task-specific network access, which task-specific network access is determined according to the permissions of the task. At (3), the virtual networking service 120 generates the task-specific VPE. As used herein, the term "task-specific VPE" is intended to refer to a VPE that is created programmatically to support execution of the task, and thus does not correspond to a VPE created for other purposes (e.g., by manual user creation). Creation of the task-specific VPE can include, for example, allocating an identifier to the VPE, instructing host computing devices to accept requests to create network devices for the VPE and to route traffic in accordance with virtual networking of the VPE, etc. At (4), the virtual networking service 120 returns to the on-demand code execution system 130 a notification of the creation of the VPE.

Thereafter, at (5), the on-demand code execution system 130 creates an execution environment for the task execution "inside" of the VPE. One skilled in the art will appreciate that the term "inside" in this context is intended to refer to a logical network location of the execution environment, rather than a physical location. For example, creation of an environment inside the VPE may include creating an environment (such as a virtual machine or a software container implementing on a virtual machine) on a physical host device under control of the system 130, and attaching a logical network adapter (which may be created, for example, by the service 120) to the execution environment. Thus, the environment can be provided with network access to the VPE. The execution environment is illustratively created without other network access, and as such, code executing within the VPE can be restricted to accessing only the VPE or other networks through the VPE.

Figure 3A:
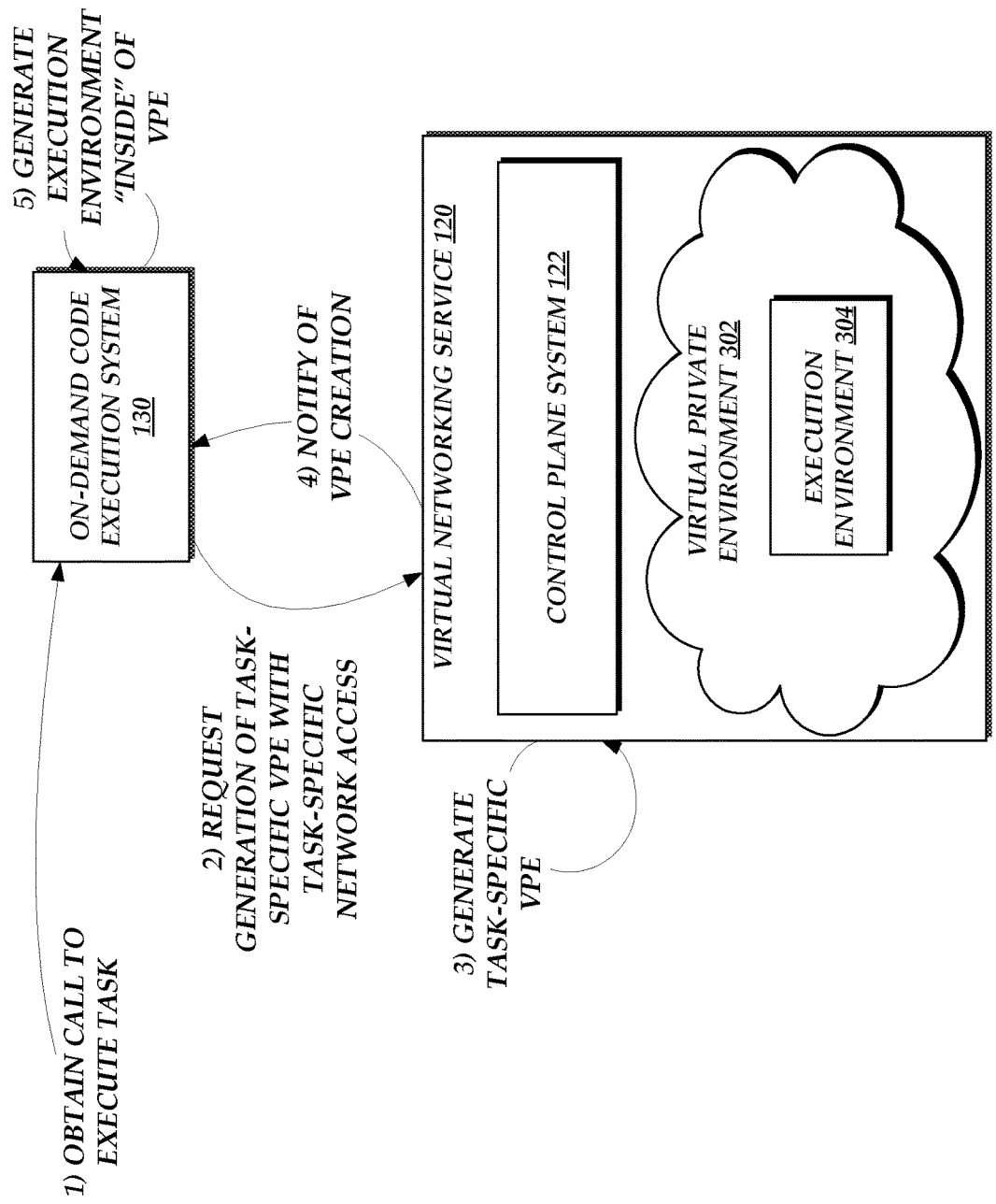
FIGS. 3A-B are flow diagrams depicting illustrative interactions for handling a request to execute a task on an on-demand code execution system of FIG. 1, including provisioning a virtual private network environment for the task with network permissions corresponding to permissions of the task.
Figure 3B:
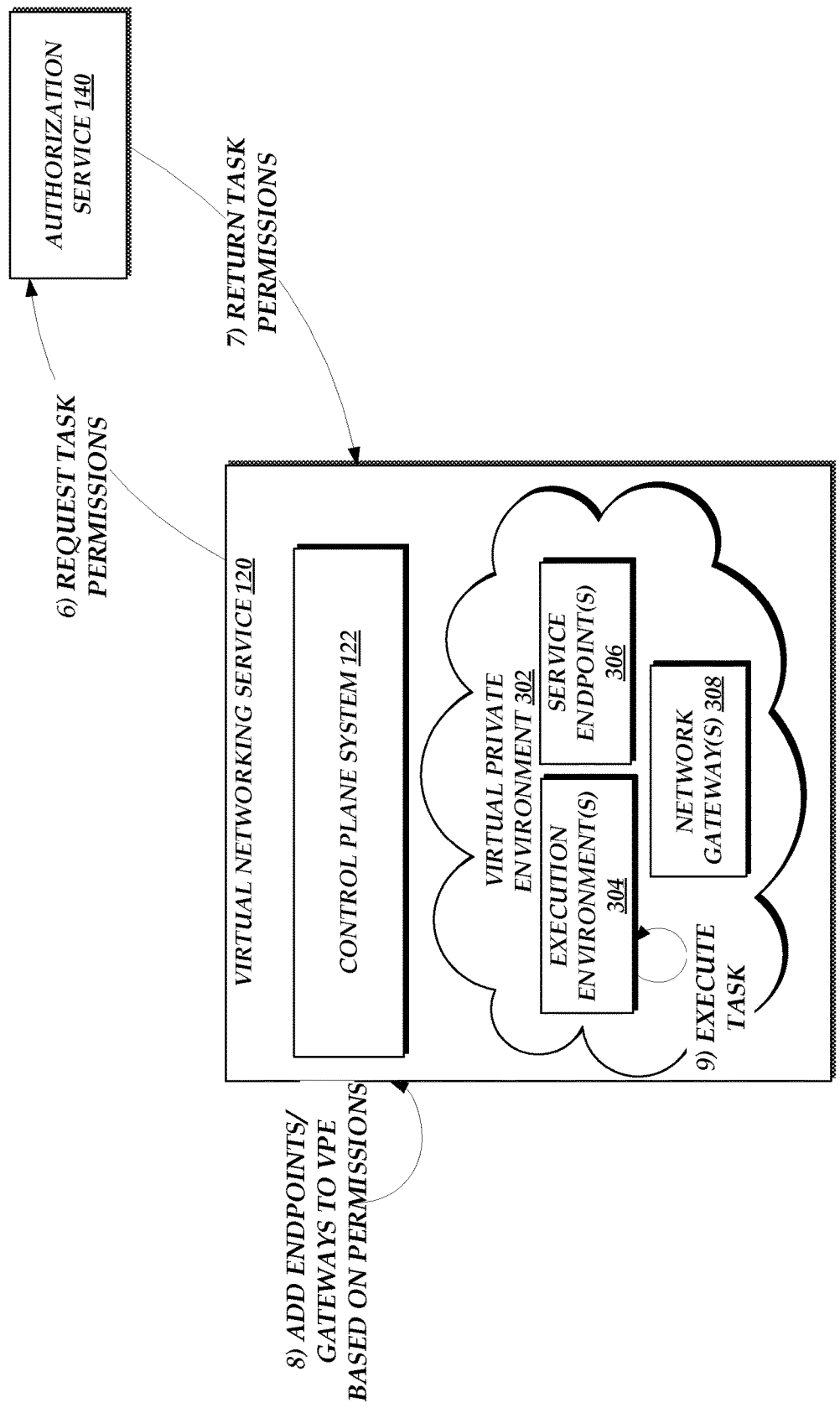

The interactions of FIG. 3A continue in FIG. 3B, where, at (6), the service 120 requests from the authorization service the set of permissions for the task. These permissions are returned to the service 120 at (7). Thereafter, at (8), the service 120 adds to the VPE a set of endpoints 306 and/or gateways 308 to the VPE based on the set of permissions, which endpoints and/or gateways collectively enable network access that is commensurate with the permissions.

In one embodiment, a service endpoint 306 is added to the VPE 302 for each service identified within the permissions using a service identifier, which may identify the service using a naming convention specific to the environment 110, as opposed to non-environment 110—specific conventions such as IP addresses or URLs. Illustratively, where the permissions specify that code of the task may transmit requests to the on-demand code execution system 130 (e.g., to invoke additional tasks on the system 130), the service 120 can add a service endpoint 306 to the VPE acting as an endpoint for the system 130. The service endpoint 306 may illustratively be configured to filter transmissions to the system 130 according to criteria specified in any associated permissions. For example, where the permissions of the task specify that executions of the task can only invoke a specific set of tasks on the system 130, the endpoint 306 may be configured to validate transmissions to the system 130 to ensure that only tasks from the specific set are called (e.g., as opposed to allowing all transmissions to reach the system 130). Similar endpoints 306 may be created for each service of the environment 110 identified within the permissions, with each endpoint 306 illustratively enforcing one or more permissions of the task with respect to that service. In some instances, a single endpoint 306 may be created for multiple services on the environment 110, rather than utilizing one endpoint 306 per service.

In addition to service endpoints 306, the virtual networking service 120 may add to the VPE 302 one or more network gateways 308 providing access to network locations permitted identified within the set of permissions. In contrast to endpoints 306, which may provide access to a service in the environment 111, gateways 308 may provide access to network locations via more general network routing protocols. For example, the set of permissions for a task may include one or more URIs or IP addresses that the task is permitted to transmit data to. A gateway 308 may therefore be included in the VPE 302 that adopts firewall rules matching the permissions of the task (e.g., allow or deny transmissions to certain IP addresses). In the case of addresses being specified by URIs, the gateway 308 may resolve the URI into an IP address, and store firewall rules based on that IP address. Thus, if permissions permit for example transmissions to the URI "domain.tld," and "domain.tld" resolves to the IP address "10.0.0.1," a gateway 308 may be configured to allow transmissions to "10.0.0.1." To prevent exfiltration of information via domain name resolution (DNS) requests, the permissions of a task may further specify one or more allowed DNS resolvers that may then be utilized in resolving the request (e.g., by whitelisting an IP address of each allowed DNS resolver). Thus, the environment 304 may be provided with network access to those network locations specified within the permissions for a task.

After configuring the VPE 302 with endpoints 306 and/or gateways 308, the task can be executed within the environment 304. Because network transmissions can leave the environment 302 only through the configured endpoints 306 or gateways 308, the task is thus prevented at a network level from gaining access to network locations or services outside of the permissions for the task. This network-level permissions enforcement may be in addition, for example, to enforcement of permissions within the execution environment 304 or at services themselves.

While the interactions of FIGS. 3A-3B depict generation of a task-specific VPE in response to a call to execute a task, in some instances calls may additionally be handled without on-demand generation of a task-specific VPE. For example, a task-specific VPE may be created on creation of a task, such that the task-specific VPE exists on a first call of a task. In another embodiment, calls to execute a task may be handled by reusing an existing task-specific VPE created in response to a prior call to execute a task. Illustratively, a first call to execute a task may result in creation of a task-specific VPE, and thereafter additional calls to execute the task may result in execution of the task within the previously-created task-specific VPE. In still other embodiments, a task-specific VPE may be generated "on-demand" in response to a predicted call to execute a task. For example, the system 130 may predict from specific user actions, such as creation of a task, modification of a task, etc., that a call to execute the task will soon occur, and may create a task-specific VPE in response to that predicted call, thus reducing time required to create the VPE in response to the call. Thus, the interactions of FIGS. 3A-3B may be modified to omit certain interactions (e.g., interactions (3) and (6)-(8). In some instances, the virtual networking service 120 may be configured with a timeout period, such that a task-specific VPE is destroyed when a task is not executing within the VPE 302 for at least the timeout period. Illustratively, the service 120 may preserve the VPE for a period of 5 minutes, 10 minutes, 1 hour, etc., after an execution of a task completes, and may destroy the VPE if no subsequent execution occurs within the period. A subsequent execution after expiration of the period may then result in recreation of a task-specific VPE, as discussed above. Thus, resource usage of the VPE may be reduced relative to constantly maintaining a VPE, particularly for tasks that are executed intermittently.

Figure 4:
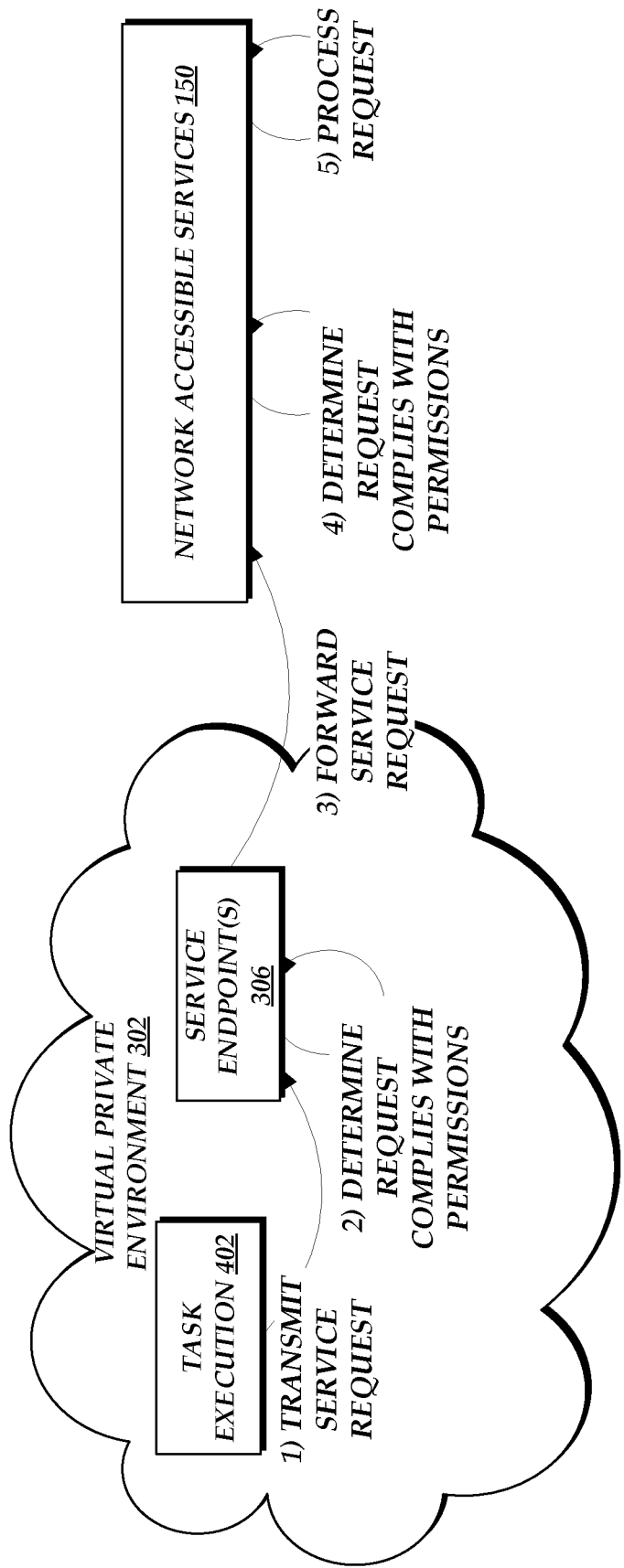
FIG. 4 is a flow diagram depicting illustrative interactions during transmission of a request for a network-accessible service from an execution of a task within the virtual private network environment of FIGS. 3A-B.

With reference to FIG. 4, illustrative interactions for processing transmissions from a task execution 402 within the VPE 302 will be described. The execution 402 may represent, for example, code of a task executing within the environment 304. During execution of the code, the code may cause the environment 304 to transmit network data, such as a request to access a service of the environment 110. Because the environment 304 is logically within the VPE 302, that network transmission is routed within the VPE 302. More specifically, in FIG. 4, the request is routed to an endpoint 306 for the service, as shown at (1). Other transmissions, such as those directed to network locations, may alternatively be routed to a gateway 308 within the VPE 302 where similar interactions to those of FIG. 4 may occur.

Thereafter, at (2), the service endpoint 306 handling the request verifies that the request complies with permissions set for the endpoint 306, which permissions are set based on the permissions for the task. Illustratively, where the request is a request to access a specific "bucket" on an object storage service, the endpoint 306 may verify that permissions for the endpoint 306 allow for access to that bucket. Similarly, where the request is a request to invoke a task on the system 130, the endpoint 306 may verify that the permissions for the endpoint 306 allow for invocation of that task. If the request were handled at a gateway 308, the gateway 308 may validate that the request is transmitted to a permitted IP address, for example, or that attributes of the request are permitted (e.g., that an appropriate protocol is used, that contents of the request are permitted, etc.). While not shown in FIG. 4, in some instances validation of a request may include communications between the endpoint 306 and the authorization service 140 of FIG. 1. For example, rather than storing permissions information locally, the endpoint 306 may be configured to pass information regarding the request to the service 140, which may respond with a permit/deny response enforced at the endpoint 306. In other instances, the endpoint 306 may store permissions information locally and thus validation of the request may not require external communications.

After verifying that the request complies with endpoint permissions, the endpoint 306, at (3), forwards the service request to the corresponding service 150. The service 150, in turn at (4), verifies that the request complies with task's permissions for the service. If the task does so comply, the service 150 processes the request at 150. Thus, transmissions from the task execution 402 are subject to both endpoint permissions, as enforced by the endpoint 306, and service permissions as enforced by the service 150.

Because endpoint permissions are established based on a task's service permissions, the verifications occurring at (2) and (4) can in many instances be expected to match. Nevertheless, use of both verifications can have various advantages. For example, verification at the endpoint 306 may reduce load on the service 150 as well as load on a network between the endpoint 306 and the service 150 (e.g., by filtering out impermissible traffic at the VPE 302 level). Moreover, in the instance that a flaw in verification exists at the service 150 or endpoint 306 level that is specific to that verification process, double verification can reduce the likelihood that such a flaw is exploited. Thus, multiple levels of verification in accordance with can generally increase security of the task execution 402.

Moreover, it is contemplated that in some instances the verifications occurring at (2) and (4) may not have the same result. Illustratively, while permissions for an endpoint 306 can be established based on a task's permissions for a service, the endpoint 306's permissions may nevertheless be maintained separately (e.g., at the endpoint 306 or at the authorization service 140). Thus, modification to the task's permissions for the service may not result in modification of permissions at an already-existent endpoint 306. In some cases, such "drift" in permission scope may be desirable (e.g., to prevent fraudulent expansion of privileges from taking effect). In other instances, such drift may be undesirable, and as such the endpoint 306 permissions and the task's permissions for the service may be synchronized, such that a change in the task's permissions for a service is also propagated to the endpoint 306.

Figure 5:
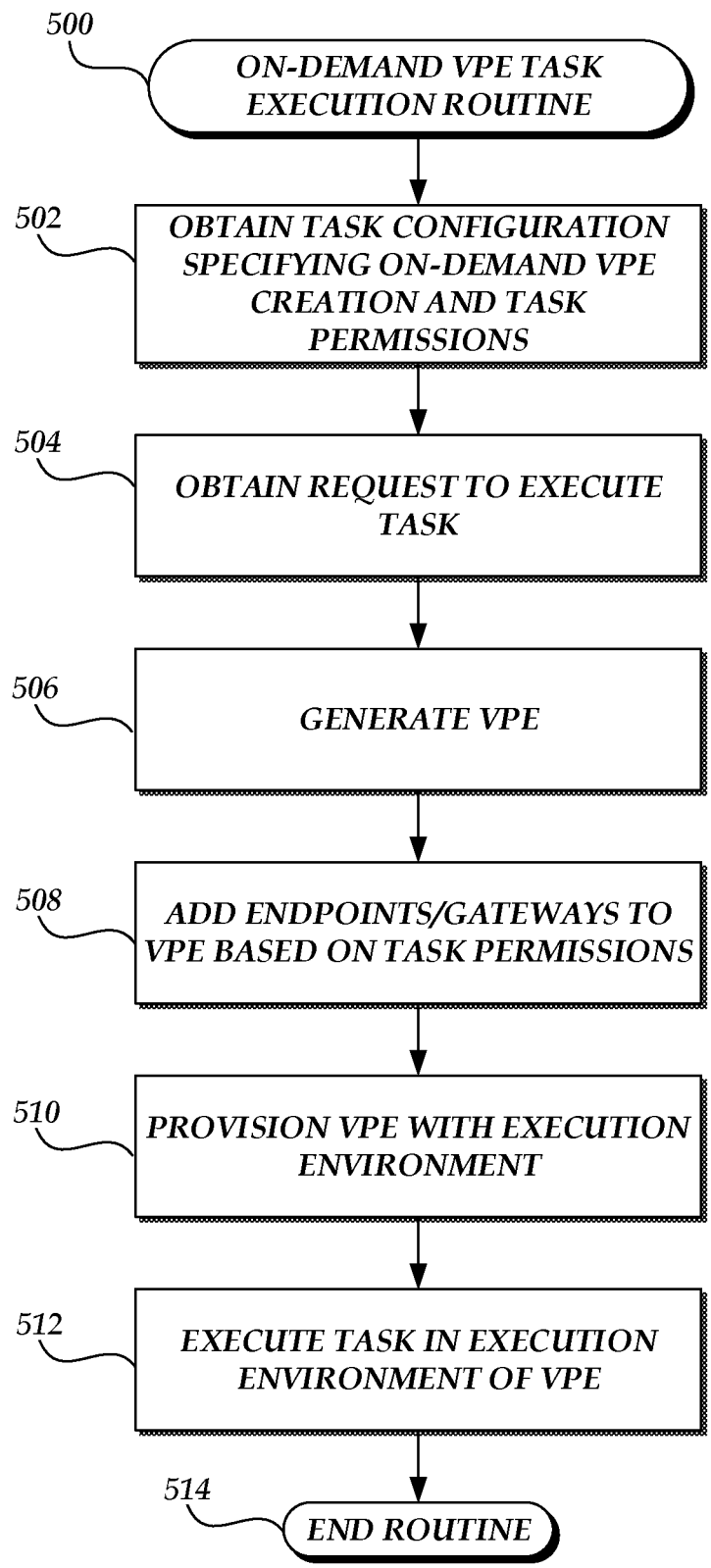
FIG. 5 is a flow chart depicting an illustrative routine for providing on-demand virtual private network environments for code executions on an on-demand code execution system of FIG. 1.

With reference to FIG. 5, an illustrative routine 500 will be described for providing VPE execution of a task, in accordance with embodiments of the present disclosure. The routine 500 may be carried out, for example, by the hosted computing environment 110.

The routine 500 begins at block 502, where the environment 110 (e.g., the on-demand code execution system 130) obtains configuration information for a task, indicating that the task should be executed within a task-specific VPE. The configuration information further includes permissions for the tasks, such as a set of services and/or network locations that the task is permitted (or is not permitted) to access and conditions on such access.

Thereafter, at block 504, the environment 110 (e.g., the on-demand code execution system 130) obtains a request to execute the task. For purposes of description of routine 500, it will be assumed that a task-specific VPE does not currently exist for the task. As such, at block 506, the environment 110 (e.g., the virtual networking service 120) creates a task-specific VPE for the task.

As noted above, a VPE by default may be an isolated network environment. As such, to enable traffic to exit the VPE, the environment 110 (e.g., the virtual networking service 120) at block 508 adds endpoints and/or gateways to the VPE. The specific number of endpoints and gateways added may be based on the set of permissions, and each endpoint or gateway may be assigned permissions based on a subset of permissions of the task. For example, where the task's permission specify permission to access one or more services, an endpoint may be added to the VPE for each service identified in the task's permissions, which endpoint is configured with endpoint permissions that match those permissions for the service in the task's permissions. Similarly, where a task's permissions specify access to one or more network locations, a gateway may be added to the VPE that controls access to those locations. In one embodiment, a single gateway may be used to control access to all network locations identified in a task's permissions. In another embodiment, multiple gateways may be used, such as one gateway for each distinct network to be accessed by the task (e.g., the Internet, another VPE, etc.). Network access within the VPE may thus be limited in a manner commensurate with the permissions of the task. Notably, such network-level access restrictions can be put into place regardless of whether the permissions for the tasks themselves define network-level restrictions. For example, permissions for a task may include only service-level permissions. Nevertheless, the environment 110 may derive network-level restrictions from those service-level permissions, thus enabling programmatic creation of task-specific VPEs without requiring manual specification of network-level restrictions for such VPEs.

Thereafter, at block 510, the environment 110 (e.g., the on-demand code execution system 130) attaches an execution environment to the VPE, such that the environment has network access via the VPE. Illustratively, the system 130 may request a logical network adapter connected to the VPE from the virtual networking service 120, and logically "attach" the adapter to the environment. Subsequently, at block 512, the environment 110 (e.g., the on-demand code execution system 130) executes the task within the execution environment of the VPE. Accordingly, code of the task can be run within the environment, and network transmission from the code execution can be made subject to the network-level restrictions imposed by execution within the VPE. Overall security of the task execution can therefore be increased, without requiring manual creation or configuration of a VPE.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more computing devices providing a virtual networking service configured to provide virtual private environments on behalf of users, each virtual private environment representing a logical network environment isolated from other network environments; and
   one or more computing devices implementing an on-demand code execution system configured to:
      obtain a request to execute code on the on-demand code execution system that represents a task, wherein the task is associated with a set of service permissions indicating network-accessible services which executions of the code are permitted to access, wherein the set of service permissions includes criteria for evaluating whether to permit service requests from executions of the code to the network-accessible services; and
      in response to the request to execute the code:
         generate a task-specific virtual private environment on the virtual networking service;
         provision an execution environment for the task with network access to the task-specific virtual private environment;
         populate the task-specific virtual private environment with one or more network endpoints providing network access to the services which executions of the code are permitted to access, wherein the one or more network endpoints are configured to enforce a set of network-level restrictions derived from the set of service permissions by evaluating network transmissions from executions of the code to the network-accessible services according to the criteria; and
         execute the code within the execution environment.

2. The system of claim 1, wherein each virtual private environment is isolated from other network environments by associating the virtual private environment with a default rule that prevents network traffic from entering or leaving the virtual private environment unless permitted by an additional rule added to the virtual private environment.

3. The system of claim 1, wherein the task-specific virtual private environment provides the execution environment with network access only to the one or more network endpoints and prevents access to any network other than the virtual private environment.

4. The system of claim 1 further comprising one or more computing devices implement a first endpoint of the one or more endpoints, wherein the first endpoint is associated with a first network-accessible service of the network-accessible services which executions of the code are permitted to access, and wherein the first endpoint is configured to:
   obtain a network transmission from an execution of the code within the execution environment;

evaluate the network transmission according to the criteria; and if the criteria indicate that the network transmission is permitted, forward the network transmission to the first network-accessible service.

5. A computer-implemented method comprising:

obtaining a request to execute code on an on-demand code execution system, wherein the code is associated with a set of service permissions indicating network-accessible services which executions of the code are permitted to access, and wherein the set of service permissions includes criteria for evaluating whether to permit service requests from executions of the code to the network-accessible services; and in response to the request to execute the code:

generating a virtual private environment on a virtual networking service, the virtual private environment representing a logical network environment isolated from other network environments;

provisioning an execution environment for the code with network access to the virtual private environment;

populating the virtual private environment with one or more network endpoints providing network access to the services which executions of the code are permitted to access, wherein the one or more network endpoints are configured to enforce a set of network-level restrictions derived from the set of service permissions by evaluating network transmissions from executions of the code to the network-accessible services according to the criteria; and executing the code within the execution environment.

6. The computer-implemented method of claim 5, wherein the code is associated with a set of network permissions further indicating a set of network addresses to which executions of the code are permitted access, and wherein the method further comprises:

populating the virtual private environment with a network gateway configured to route permitted network transmissions between the virtual private environment and a network external to the virtual private environment via which network addresses of the set of network addresses are accessible; and configuring the network gateway to permit network transmissions addressed to the set of network addresses.

7. The computer-implemented method of claim 6, wherein the set of network permissions further indicate a resource identifier to which executions of the code are permitted access, and wherein the method further comprises:

resolving the resource identifier into a network address; and configuring the network gateway to permit network transmissions addressed to the network address.

8. The computer-implemented method of claim 5, wherein the execution environment is a virtual machine, and wherein provisioning the execution environment for the code with network access to the virtual private environment comprises generating a logical network adapter and attaching the logical network adapter to the virtual machine.

9. The computer-implemented method of claim 5, wherein the execution environment is a software container executing on a virtual machine.

10. The computer-implemented method of claim 5, wherein the request to execute the code is a first request, and wherein the method further comprises:

receiving a second request to execute the code;

determining that the virtual private environment generated in response to the first request to execute the code has not yet been destroyed; and responding to the second request to execute the code by initiating an additional execution of the code on an execution environment within the virtual private environment.

11. The computer-implemented method of claim 5 further comprising:

determining that the code has not executed within the execution environment for at least a threshold period of time; and destroying the virtual private environment on the virtual networking service.

12. The computer-implemented method of claim 5 further comprising, at a first endpoint of the one or more of endpoints:

obtaining a network transmission from the execution environment requesting access to a first network-accessible service of the network-accessible services;

evaluating the network transmission according to the criteria; and subsequent to determining that the criteria indicate that the network transmission is permitted, forwarding the network transmission to the first network-accessible service.

13. The computer-implemented method of claim 12, wherein the first network-accessible service is also configured to evaluate the network transmission according to the criteria.

14. One or more non-transitory computer-readable media comprising computer-executable instructions that, when executed by a computing system, cause the computing system to:

obtain a request to execute code on an on-demand code execution system, wherein the code is associated with a set of service permissions indicating network-accessible services which executions of the code are permitted to access;

generate a virtual private environment on a virtual networking service, the virtual private environment representing a logical network environment isolated from other network environments;

provision an execution environment for the code with network access to the virtual private environment;

populate the virtual private environment with one or more network endpoints providing network access to the services which executions of the code are permitted to access, wherein the one or more network endpoints are configured to enforce a set of network-level restrictions derived from the set of service permissions; and execute the code within the execution environment.

15. The one or more non-transitory computer-readable media of claim 14, wherein the one or more network endpoints comprise a plurality of network endpoints, each network endpoint corresponding to an individual service the network-accessible services.

16. The one or more non-transitory computer-readable media of claim 14, wherein the instructions further cause the computing system to obtain a modification of the set of service permissions and to modify a configuration of the one or more network endpoints to enforce the set of service permissions according to the modification.

17. The one or more non-transitory computer-readable media of claim 14, wherein the code is associated with a set of network permissions indicating a set of network addresses to which executions of the code are permitted access, and wherein the instructions further cause the computing system to:

populate the virtual private environment with a network gateway configured to route permitted network transmissions between the virtual private environment and a network external to the virtual private environment via which network addresses of the set of network addresses are accessible; and configure the network gateway to permit network transmissions addressed to the set of network addresses.

18. The one or more non-transitory computer-readable media of claim 17, wherein the set of network permissions further indicate a resource identifier to which executions of the code are permitted access, and wherein the instructions further cause the computing system to:

resolve the resource identifier into a network address; and configure the network gateway to permit network transmissions addressed to the network address.

19. The one or more non-transitory computer-readable media of claim 14, wherein the set of service permissions includes criteria for evaluating whether to permit service requests from executions of the code to the network-accessible services, and wherein the instructions further cause the computing system to configure the one or more network endpoints to enforce the set of network-level restrictions by evaluating network transmissions from executions of the code to the network-accessible services according to the criteria.

20. The one or more non-transitory computer-readable media of claim 14, wherein the instructions further cause the computing system to:

determine that the code has not executed within the execution environment for at least a threshold period of time; and destroy the virtual private environment on the virtual networking service.

\* \* \* \* \*